UNITED STATES PATENT OFFICE.

HENRY V. DUNHAM, OF MOUNT VERNON, NEW YORK.

CASEIN COMPOSITION.

1,334,358.   Specification of Letters Patent.   Patented Mar. 23, 1920.

No Drawing.   Application filed March 25, 1919.   Serial No. 285,079.

*To all whom it may concern:*

Be it known that I, HENRY V. DUNHAM, a citizen of the United States, residing at Mount Vernon, in the county of Westchester and State of New York, have invented certain new and useful Improvements in Casein Compositions, of which the following is a specification.

Karaya gum is a gum coming from a tree of the cola nut family, and while insoluble in water, it swells greatly therein. When water and alkali (*e. g.* $Na_2CO_3$ or $NaHCO_3$) are added and the mixture boiled for a considerable time, with suitable agitation, or even if the mixture is allowed to stand without boiling, for a considerable time, preferably being stirred from time to time, the gum dissolves, producing a very viscous solution. This solution when diluted to represent a strength in gum of 1:200 is still of a mucilagenous or almost gelatinous character.

According to the present invention, I produce a mixture of karaya gum and casein, which ingredients may be in varying proportions, according to the desire, but frequently a proportion of about one part of karaya gum to four parts of casein is suitable.

The karaya gum may be dissolved with the aid of alkali, and added to a casein solution (in alkali) and the mixture dried (*e. g.* on a milk drying cylinder apparatus) thereby producing a readily soluble product containing the karaya gum and casein.

In forming an insoluble mixture, which may be made soluble by the addition of alkali, I may dissolve the karaya gum in an alkaline solution, preferably using more or less excess of alkali over the amount necessary to produce solution (say 3% excess), add such solution to milk (*e. g.* skimmed milk) and add acid in the usual way, to precipitate the casein content of the milk. Both the casein and the karaya gum will thereby be thrown down as a precipitate consisting of an intimate mixture of substantially the entire amounts of both of these materials. This precipitate is soluble in alkaline solutions. The curd can be dried, or after washing can be at once redissolved with the aid of an alkali.

In another example of forming a mixture, I add to freshly precipitated (and washed, but undried) casein, a solution of the karaya gum in an alkali. More alkali and water may be added if desired, to produce complete solution, which product may then be dried. Or the mass containing not enough alkali to dissolve the casein may then be thoroughly mixed and dried thereby producing a product which can be readily dissolved by the addition of water and some alkali.

In another example, the karaya gum may be added to alkaline casein solution, and stirred until it dissolves therein, more alkali being added if necessary. The solution can be dried as above.

Ordinarily karaya gum can be ground with casein or merely mixed in pulverulent or granular form therewith, and the mixture dissolved in alkali. It is not so easy to dissolve such a product with alkali, as to dissolve first the gum and subsequently the casein in the alkaline solution.

Such mixtures or combinations of casein and karaya gum as described above have been found to be very efficient in the manufacturing of a great many products. For example, such a mixture when used in the manufacture of wall coverings known as "calcimines", improve those products very much from the fact; first, that this combination not only gives the adhesive properties necessary for binding the mineral base to the wall surface, but that this combination assists in keeping the calcimine from drying too rapidly and thus causing what is known as "laps", which very often occurs when ordinary casein is used as the binder, the result being that the wall surface when finished shows streaked effects.

This combination of casein and karaya gum also has distinct advantages in different lines of the baking industry where the mixture of floor and other baking ingredients requires a concentrated albuminous substance, as well as a medium to give buoyancy to the products during the process of baking.

What I claim is:

1. A composition of matter comprising casein and karaya gum.

2. A composition of matter comprising soluble casein and soluble karaya gum.

In testimony whereof I affix my signature.

HENRY V. DUNHAM.